United States Patent [19]

Fortune

[11] 4,292,706
[45] Oct. 6, 1981

[54] HEAVY DUTY DESOLDERING TOOL

[76] Inventor: William S. Fortune, 29866 Cuthbert St., Malibu, Calif. 90265

[21] Appl. No.: 68,118

[22] Filed: Aug. 20, 1979

[51] Int. Cl.³ .............................................. A47L 5/04
[52] U.S. Cl. ...................................... 15/341; 15/344; 228/20
[58] Field of Search ..................... 15/341, 344; 228/20

[56] References Cited

U.S. PATENT DOCUMENTS

| | | | |
|---|---|---|---|
| 3,263,889 | 8/1966 | Fortune | 15/341 X |
| 3,818,539 | 6/1974 | Fortune | 15/341 |
| 3,862,468 | 1/1975 | Fortune | 15/341 X |

FOREIGN PATENT DOCUMENTS 2736309  3/1978  Fed. Rep. of Germany ........ 15/341

Primary Examiner—Chris K. Moore
Attorney, Agent, or Firm—Daniel T. Anderson

[57] ABSTRACT

A heavy duty, pneumatic or manually operable handheld desoldering tool. The tool comprises a hollow cylindrical large size barrel. There is further provided a hollow plunger loading cylinder and a plunger assembly removably mounted on the plunger loading cylinder. A plunger loading member is concentric with the plunger loading cylinder and includes a hollow cylinder slidable within the loading cylinder. A plunger loading guide is disposed concentric with and partially surrounding the plunger loading cylinder. Spring means are disposed in the plunger loading cylinder for urging the loading member outwardly and away from the loading cylinder. Trigger means are connected to the barrel and externally actuable for locking the plunger loading cylinder in its cocked, loaded position and for releasing it. Heavy duty spring means are disposed in the barrel and are retained between the plunger and the rear end of the barrel for rapidly returning the plunger rearwards upon release of the trigger means. This creates a vacuum and rapidly sucks in the ambient air for removing hot solder.

10 Claims, 11 Drawing Figures

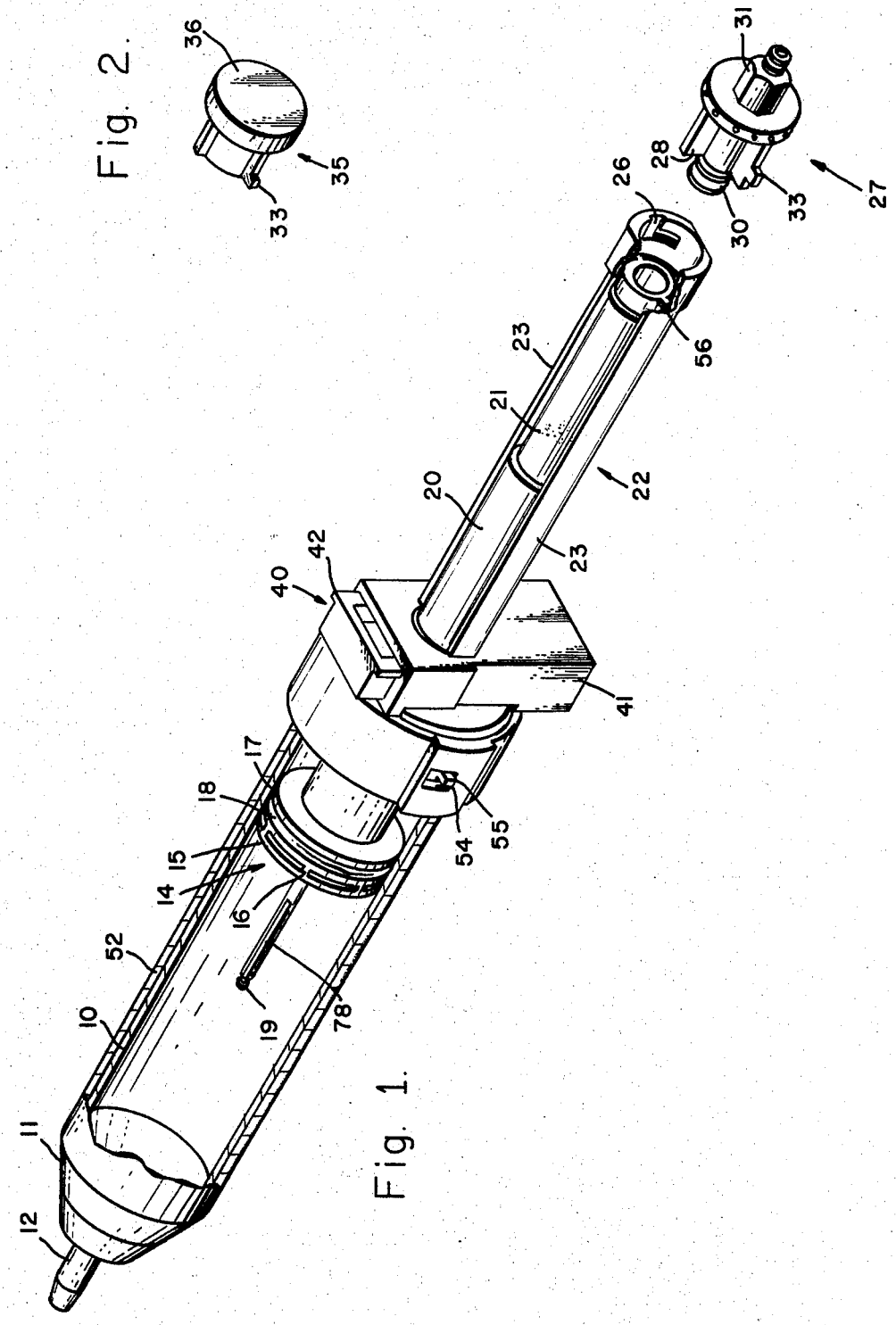

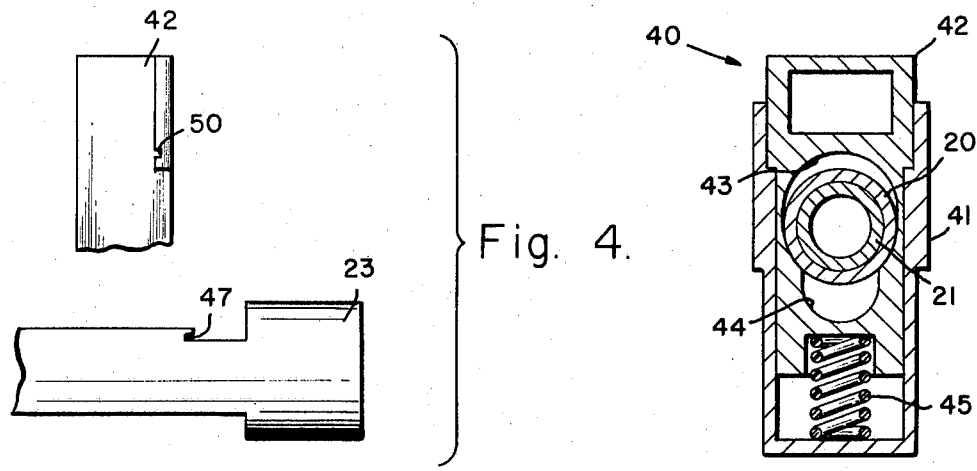
Fig. 3.
Fig. 4.
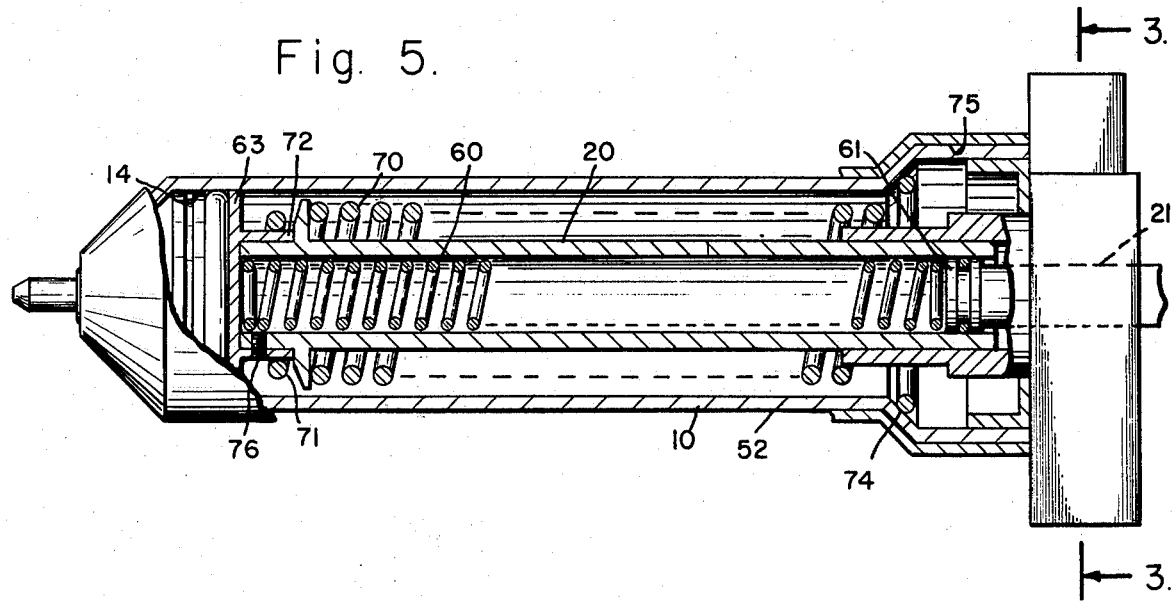
Fig. 5.
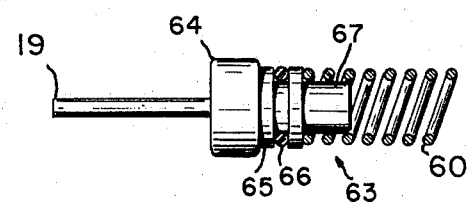
Fig. 6.

HEAVY DUTY DESOLDERING TOOL

BACKGROUND OF THE INVENTION

The present invention may be considered to be an improvement over Applicant's prior U.S. Pat. No. 3,263,889 of Aug. 2, 1966. While the solder removal apparatus of the prior patent is excellently adapted for many purposes, its capacity is somewhat limited. Therefore, it was desirable to have a desoldering tool with a larger capacity both for removing solder rapidly and efficiently and for providing a larger storage space for the thus removed solder.

Furthermore, the prior solder removal apparatus above referred to is solely adapted for manual operation. This, of course, reduces the efficiency by requiring more time to cock the tool between desoldering operations. It was, therefore, desirable to provide a tool which can be automatically cocked for more rapid operation.

It is accordingly an object of the present invention to provide a desoldering tool of the character discussed which has a large capacity both for rapidly creating a vacuum to draw in large amounts of liquid solder and for storing such solder as solidified waste.

A further object of the present invention is to provide such a tool which may selectively be either manually operated or pneumatically operated by means of compressed air.

Still a further object of the present invention is to provide a desoldering tool as discussed herein which is easy to operate and which may readily be taken apart for cleaning or repair.

SUMMARY OF THE INVENTION

The desoldering tool of the present invention is characterized by a relatively large barrel. This substantially increases the capacity of the tool for rapidly sucking or drawing in large quantities of air to facilitate desoldering operations. Furthermore, due to its large capacity it can store a relatively large amount of solidified solder before it is necessary to clean out the tool.

The pneumatic operation of the tool is made possible by the fact that the tool includes in this example, a loading guide, a plunger loading piston and a plunger loading cylinder, all disposed concentric to each other. For the manual operation the entire assembly of the three parts is pushed into the barrel against the force of a spring disposed between the loading piston and the loading cylinder. As soon as the loading cylinder is inside the barrel the trigger is cocked to retain the loading cylinder while the loading guide and loading piston return to their initial position.

For pneumatic operation air is impressed into the interior of the loading piston. This pushes back the plunger loading cylinder along with a plunger to cock the instrument again. Hence the instrument can be rapidly loaded by the controlled movement of compressed air into the loading piston.

In addition a heavy duty spring in the barrel includes a plurality of small coils smaller in diameter than the main body of the spring. These smaller coils are retained by a shoulder on the plunger assembly. The other end of the main spring has two nose like projections which are retained by suitable depressions or recesses in the barrel. This minimizes the load on the spring which tends to break when the spring is held by small hooks or bends.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is an exploded view in perspective, parts being broken away, of a desoldering tool shown by way of example and embodying the present invention;

FIG. 2 is a view in perspective of a bumper which may be used with the tool instead of the air fitting assembly of FIG. 1 to facilitate manual operation of the tool;

FIG. 3 is a section on line 3—3 of FIG. 5 showing a cross-section of the trigger assembly;

FIG. 4 illustrates the interlocking parts between the slide of the trigger and the loading cylinder for engagement therebetween;

FIG. 5 is an elevational view of the cocked and loaded barrel, parts being broken away to show the heavy duty main spring and the plunger loading return spring of the tool of the invention;

FIG. 6 is a side elevational view of a modified plunger shaft and plunger assembly including a spring guide for the elongated spring between the plunger loading cylinder and plunger loading piston

DESCRIPTION OF THE PREFERRED EMBODIMENT

Figure 7:
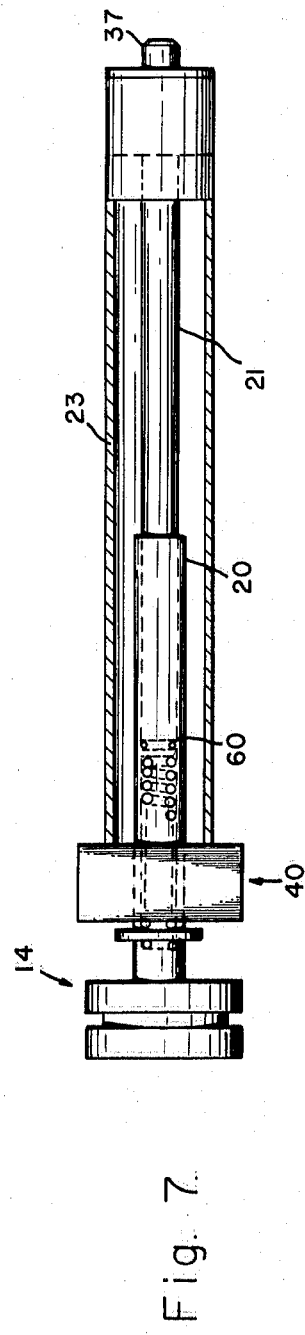
FIGS. 7 and 8 are elevational views, parts being broken away of the tool of the invention during various phases of the pneumatic loading operation.

Referring now to the drawings and particularly to FIGS. 1 through 5, there is illustrated by way of example a preferred embodiment of the present invention relating to a hand-held heavy duty desoldering tool. The desoldering tool as shown particularly in FIG. 1, includes a relatively large barrel 10 which is hollow and has a conical tip end 11 to which is secured a tip assembly 12. Preferably the tip assembly 12 is that disclosed and claimed in the Applicant's copending application Ser. No. 922,676 filed on July 7, 1978, and now U.S. Pat. No. 4,204,299, issued May 27, 1980.

Disposed in the barrel 10 is a plunger assembly 14. The plunger assembly has an annular groove 15 near its front end the outer edge of which which may be mechanically supported by a plurality of transversely extending struts 16. A second annular groove 17 in the plunger assembly 14 disposed rearwardly of the groove 15 is provided with an O-ring 18 to establish a sliding seal with the inner surface of the barrel 10. Extending from the plunger assembly 14 is a tip cleaning rod 19.

The plunger assembly 14 is secured to a plunger loading cylinder 20 which in turn is concentric with a plunger loading piston 21 slidable within the loading cylinder 20. Both the loading cylinder 20 and the loading piston 21 are slidable within a loading guide 22 consisting substantially of two opposed sections 23.

The plunger assembly 14 is secured to the plunger loading cylinder 20 by a set screw connection shown at 76. An air fitting assembly 27 may be secured to the open end of the plunger loading piston 21 by means of vane like extensions 28 on the air fitting assembly. The front end of the air fitting assembly is provided with an O-ring 30 to seal against the inner surface of the plunger loading piston 21. A metallic air fitting 31 may be screwed over the screw threads of the air fitting assembly 27.

The air fitting assembly also includes two lock and key tabs 33 which cooperate with the lock and key slot 26 on the loading guide 22. Hence the lock and key tab 33 and key slot 26 form a bayonet construction which may be locked by a quarter turn.

When it is not desired to use an air fitting assembly it is feasible to use a bumper 35 as illustrated in FIG. 2. The bumper 35 is provided with a substantially flat outer surface 36 to facilitate pushing of the structure by hand and with lock and key tabs 33. This bumper 35 replaces the air fitting assembly 27.

There is further provided a trigger assembly 40 which may generally resemble that of Applicant's prior patent above referred to. The trigger assembly 40 includes a housing 41 and a slide 42 as shown more clearly in FIG. 3. The slide 42 is provided with a central opening 43. Hence the plunger loading cylinder 20 and the plunger loading piston 21 extend through the circular opening 43. The slide 42 is provided with a lower open portion 44 of smaller diameter through which only the plunger loading piston 21 may pass. The slide 42 is upwardly biased by a spring 45 disposed between the housing 41 and the slide 42. When the plunger loading piston 21 and the plunger loading cylinder 20 are moved toward the left of FIG. 1 the larger diameter loading cylinder 20 is eventually pushed to the left of the slide 42. This permits the spring 45 to push the slide upwards so that the smaller diameter plunger loading piston 21 now occupies the space 44. This in turn will lock the instrument in the cocked position because the plunger loading cylinder 20 is prevented from returning to the right.

When the slide 42 is pushed downwardly against the action of the spring 45 the plunger loading cylinder 20 is permitted to return to the right as is the plunger 14. This in turn will create a vacuum in the barrel 10 thus drawing in any solder near the tip assembly 12.

As shown in FIG. 4, the loading guide 23 is provided with a recess 47 at its far right-hand portion as shown in FIGS. 1 and 4. This recess 47 is capable of cooperating with a corresponding recess 50 in the slide 42. Hence by pushing the loading guide 22, plunger loading cylinder 20 and plunger loading piston 21 as far as possible into the barrel 10 and by pushing down on the slide 42 the instrument may be locked for easy transport. This will, of course, substantially reduce the length of the instrument and cause it to be less vulnerable to damage in transit or storage.

As shown in FIG. 1, the barrel 10 may be enclosed by a flexible cover 52. This may have an outer somewhat rough surface to facilitate holding of the instrument in the hand. The cover 52 may, for example, consist of a vinyl which is chemically treated to make it slightly conducting and hence provide a slow static discharge through the end of the holder. For the same reason the tip assembly 12 may also be made of slightly conductive material so as to provide a conductive electrically dissapative path from the tip assembly 12 to the cover 52 and thence to the hand of the holder.

The trigger housing 40 is also provided with a lock key tab 55 extending through the housing 40 (FIG. 1) which also forms a bayonet connection with corresponding aperture 54 in the rearward end of the barrel 10. This again provides for a closure by rotating the housing 40 slightly, to lock it. A similar bayonet connection is provided by the plunger loading piston 21 and the loading guide 22 at the far or right-hand end. Thus the loading piston 21 is provided with a corresponding lock and key tab 56 cooperating with corresponding slots in the end of the loading guide 22. This construction substantially facilitates assembly of the instrument and also facilitates taking apart of the instrument as will be subsequently explained.

Referring now to FIG. 5 there is illustrated a sectional view of the instrument to show more clearly the springs which propel the plunger assembly 14 and which cause the plunger loading piston 21 to return toward the right. Thus as shown in FIG. 5, there is provided a return spring 60 disposed about the plunger loading piston 21 and within the plunger loading cylinder 20. The spring 60 rests at one end against the rear surface 61 of the plunger loading piston 21. Its other end may bear against the tip cleaning assembly 63 shown particularly in FIG. 6, being a modification of the connection between spring 60 and assembly 63. The tip cleaning assembly includes the tip cleaning rod 19 secured to a suitable piston 64 forming part of the plunger assembly 14 having a reduced diameter portion 65 and provided with O-seal 66. A spring guide 67 extends rearwardly of the tip cleaning assembly 63 and serves the purpose to guide the plunger loading return spring 60 as clearly shown in FIG. 6.

The main spring 70 which is the one that actuates the plunger assembly 14, has a small diameter front portion 71 which extends about the rear portion of the plunger assembly 14. The plunger assembly 14 has a small diameter disk 72 about which the spring portion 71 fits. The rearward portion 73 of the main spring has two noselike extensions 74 which fit into the corresponding channels 75 of the rear portion of the barrel 10. Both spring portions are retained without the necessity of providing hooks or the like. Such sharply bent portions of the spring are liable to break and may cause breakdown of the instrument.

There may be provided a screw 76 to fasten the plunger assembly 14 to the outer plunger loading cylinder 20. This will prevent the spring 70 from becoming loose.

The tip cleaning rod 19 preferably is provided along its length with a flat portion 78. This will facilitate entrance of air into the barrel 10 through the tip assembly 12 when the plunger 15 moves backward to create a vacuum.

As mentioned before, the recess or groove 15 in the plunger assemby 14 due to the small clearance between its walls and the barrel 10 may store some of the sucked in solder thereby to keep the barrel 10 clean.

The barrel 10, trigger housing 41 and loading guide 22 may consist of acrylonitrile butatiene styrene. The remaining material such as the trigger slide 42, the two plunger cylinders 20 and 21 may, for example, consist of acetal copolymer or homopolymer. Also the tip of the tip assembly 12 may have a larger diameter than that of the conventional models. The tip cleaning rod 19 may be of aluminum. The inner diameter of the barrel 10 may, for example, be 1⅜". This is substantially larger than that of conventional desoldering tools. Preferably all parts are injection molded.

Figure 9:
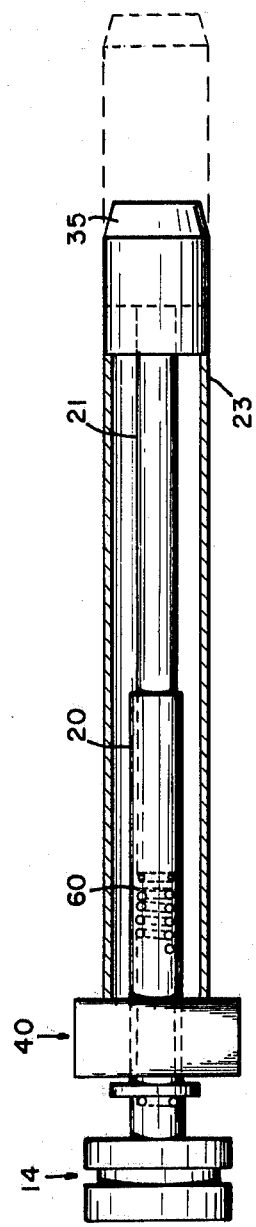
FIG. 9 is a view similar to that of FIGS. 6 and 7 but showing the operation of the tool during manual loading.

Referring now to FIG. 9, there is illustrated manual loading of the instrument described. By means of the bumper 35 the entire assembly consisting of the loading guide 23, plunger loading cylinder 20 and plunger loading piston 21 are pushed toward the left. This will compress the spring 60 as shown until the entire assembly is close to the trigger assembly 40. The instrument is then cocked in the manner previously described by the trigger slide 42 moving upwards. The instrument may be utilized by depressing the slide 42. This will permit the plunger assembly 14 to move backwards, that is toward the right thus creating a vacuum in the barrel 10 not shown in FIG. 9 to draw in liquified solder.

Figure 8:
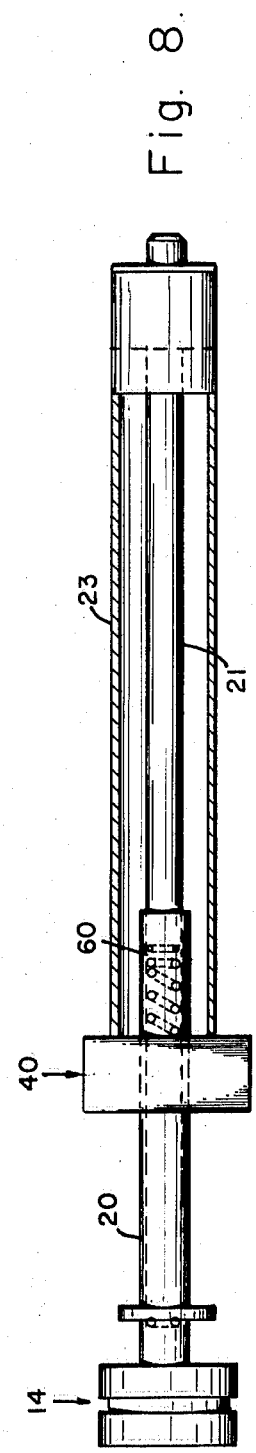

Additionally, however, and as distinguished from the operation of the Applicant's prior instrument as referred to hereinabove, the instrument of the present invention may also be pneumatically loaded. This is illustrated in FIGS. 7 and 8 to which reference is now made. Here air is injected into the air fitting assembly 37. The compressed air flows into the plunger loading piston 21 and hence tends to move the plunger loading cylinder 20 toward the left in FIGS. 7 and 8. This in turn compresses the spring 60 without, however, moving the plunger loading guide 23 or the plunger loading piston 21. Hence the plunger loading cylinder 20 moves toward the left as shown in successive positions in FIGS. 7 and 8. Otherwise, the operation of the instrument is as previously described.

The instrument may be disassembled by first removing the air fitting assembly 31. Then the entire rear portion of the instrument, including the trigger assembly 40 may be removed from the barrel by rotating the trigger assembly 40 with respect to the barrel 10, thus unlocking the lock and key tab 54. Then the main spring 70 may be removed after first removing the plunger assembly 14. The plunger loading piston 21 may be removed again by rotating its lock and key tab so as to remove it from the loading guide.

As explained hereinabove, it is possible to operate the heavy duty desoldering tool of the present invention by applying air pressure. This makes the tool adaptive for production work because it can be rapidly operated. In order to further improve the operation of the tool of the invention, a foot operated valve or foot pedal of the type illustrated in FIG. 10 may be used. This foot valve consists of a housing 80 having a flat bottom edge 81 and a vacuum or pressure inlet 82. The inlet 82 is connected to an internal conduit 83 terminating in an opening 84. Disposed slidably over the neck portion 85 of the housing is an actuating member 86 the top 87 of which may be actuated by the pressure of the foot. The actuating member 86 has a depending cylindrical portion 88 slidable over the housing portion 85. A spring 90 is disposed between an internal cylindrical chamber 89 of the actuating member 86 and the top 91 of the housing 80. By pressing on the actuating member 87 the entire member is moved downwardly against the pressure of the spring 90. Eventually the opening 84 communicates with an outlet 93 provided on the housing 80 as shown. A pair of seals 94 may be provided to seal the actuating member 87 against the housing 80.

A spring-biased button or plug 95 may be provided to plug the foot valve 86 if the instrument is used for the vacuum. Otherwise, if it is used with pressure, the plug 95 opens against the force of its spring 96 to provide an exit for the pressure. A small flexible hose with an internal diameter of 1/16" may be used to supply air pressure to the inlet 82. The outlet 93 may be connected by a flexible hose 97 to the air fitting 31 to pneumatically cock the instrument of FIG. 1 as described.

Figure 10:
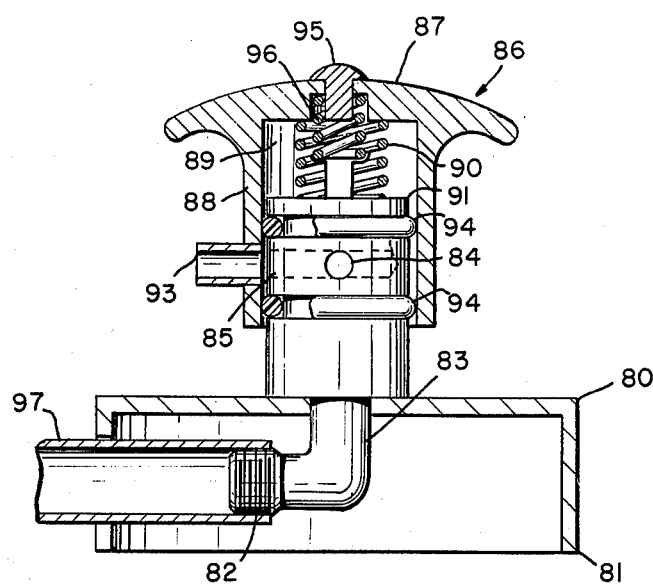
FIG. 10 is a cross-sectional view of a foot valve or foot pedal for selectively applying vacuum to the tool of the invention and which may be utilized with an external source of air pressure to automatically and rapidly cock the tool so that it is ready for the next operating cycle.

It is also feasible to utilize at least a large portion of the foot valve of FIG. 10 to serve as a tool holder and tip cleaner. Such an arrangement has been illustrated in FIG. 11.

The tool holder and tip cleaner of FIG. 11 again utilizes the housing 80 shown at FIG. 10 to serve as a tool holder and tip cleaner. Such an arrangement has been illustrated in FIG. 11.

The tool holder and tip cleaner of FIG. 11 again utilizes the housing 80 shown at FIG. 10. It is surrounded by a structure 100 which will receive solder from the tool of the invention. The structure 100 is basically cylindrical but has an inner cylindrical projection 101 which may be sealed by O-rings 102 against the housing 80. The structure 101 is biased against the base 80 by two springs 103 surrounding each post 99. A solder filter or screen 104 may be disposed within the cylindrical portion 100. An upper structure 106 is made to receive the tool of FIG. 1 and particularly the barrel 10, its reduced portion 11 and the tip assembly 12. The tool 10 is received by a removable cylindrical insert 107 having a smaller vertical cylindrical portion 108 against which reduced portion 11 of the instrument rests.

Figure 11:
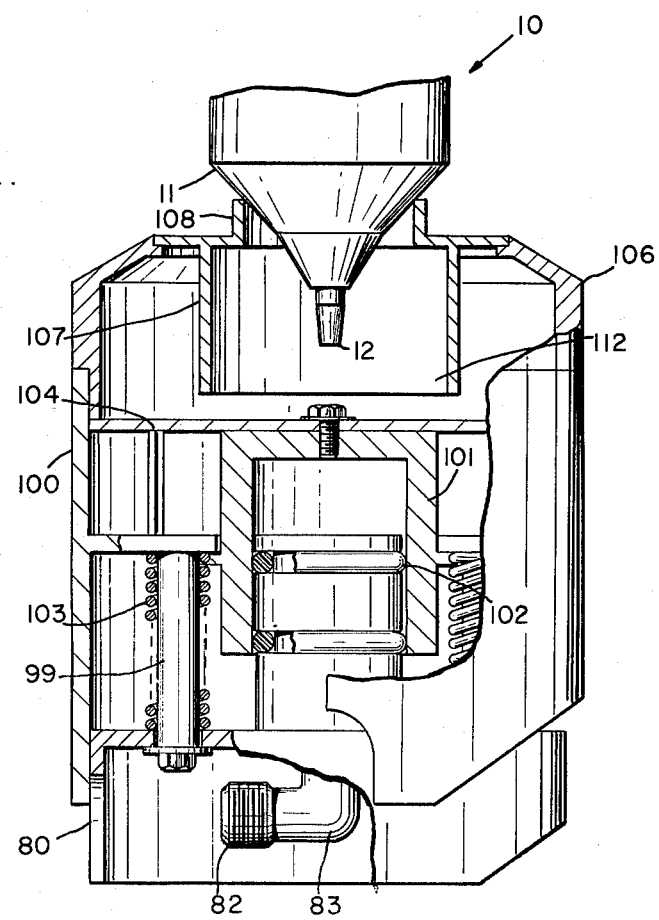
FIG. 11 is a cross-sectional view of a tool holder and tip cleaner utilizing a portion of the foot valve of FIG. 10.

The tool holder and tip cleaner operates as follows: The tool 10 is inserted as shown in FIG. 11. It will then hold the tool in the position shown by the tool holder insert 107. When it is desired to clean the tool, pressure is exerted on the tool 10 which pushes the cylindrical portion 100 against the base 80 against the action of the spring 103. This creates a vacuum in the space 112. This vacuum tends to draw out the solder which has been collected in the tool 10. The solder then collects on the screen 104. Hence it will be realized that the solder is withdrawn without requiring any external sources of vacuum or air pressure.

There has thus been disclosed a heavy duty pneumatically or manually operable desoldering tool. The tool is characterized by its large capacity and quick operation. For production runs it may be utilized with an external source of air pressure to automatically and rapidly cock the tool for desirably high operating rates.

What is claimed is:

1. A heavy duty, pneumatically or manually operable hand held desoldering tool comprising:
    (a) a hollow cylindrical barrel having tip and rear ends;
    (b) a hollow plunger loading cylinder;
    (c) a plunger assembly removably mounted on said plunger loading cylinder;
    (d) a plunger loading piston concentric with said loading cylinder and including a hollow cylinder slidable within said loading cylinder;
    (e) a plunger loading guide disposed concentric with and partially surrounding said plunger loading cylinder;

(f) spring means disposed within said plunger loading cylinder and urging said loading piston outwardly away from said loading cylinder;

(g) trigger means connected to said barrel and externally actuable for locking said plunger loading cylinder in its cocked position and for releasing it; and (h) heavy duty spring means in said barrel and retained between said plunger and the rear end of said barrel for rapidly returning said plunger rearwards upon release of said trigger means.

2. A tool as defined in claim 1 wherein said trigger means is disposed about said loading guide.

3. A tool as defined in claim 1 wherein bayonet locking means is provided between said barrel and said trigger means.

4. A tool as defined in claim 1 wherein bayonet locking means is provided by the rear end of said loading piston and said loading guide.

5. A tool as defined in claim 1 wherein said trigger means includes a slide for locking and unlocking said plunger loading cylinder, and locking means between said trigger slide and a retaining portion on said loading guide for engagement therebetween.

6. A tool as defined in claim 1 wherein an air fitting is provided for introducing compressed air into said loading piston, thereby to move said loading cylinder into said barrel to cock said trigger means, whereby pneumatic cocking operation of said tool is made possible.

7. A tool as defined in claim 1 wherein a loading bumper is provided to facilitate pushing of said loading guide, loading piston, and loading cylinder into said barrel, thereby to provide hand operation.

8. A tool as defined in claim 1 wherein a tip assembly is mounted on the tip end of said barrel, and a tip cleaning rod carried centrally on said plunger assembly and extending axially forwardly therefrom and being insertable into said tip assembly when said loading cylinder is in its said locked position, said cleaning rod having a flat to accommodate relatively large air intake through said tip assembly into said large barrel.

9. A tool as defined in claim 1 wherein said heavy duty spring means includes a series of coils having a smaller diameter than the main body of said spring means and having two nose portions at the rear end of said heavy duty spring means, said reduced diameter coils being engageable with a shoulder on said plunger while the nose portions of said spring means are retained by a recess in the rear end of said barrel.

10. A tool as defined in claim 1 wherein a plastic flexible cover is disposed about the outer surface of said barrel.

* * * * *